US012680351B2

(12) United States Patent (10) Patent No.: US 12,680,351 B2
Yoshida et al. (45) Date of Patent: Jul. 14, 2026

(54) RECIPROCAL MOVEMENT DEVICE

(71) Applicant: HI-LEX CORPORATION, Takarazuka (JP)

(72) Inventors: Sho Yoshida, Hyogo (JP); Shohei Tanaka, Hyogo (JP)

(73) Assignee: HI-LEX CORPORATION, Takarazuka (JP)

( * ) Notice: Subject to any disclaimer, the term of this patent is extended or adjusted under 35 U.S.C. 154(b) by 178 days.

(21) Appl. No.: 18/371,478

(22) Filed: Sep. 22, 2023

(65) Prior Publication Data

US 2024/0011337 A1     Jan. 11, 2024

Related U.S. Application Data

(63) Continuation of application No. PCT/JP2022/016433, filed on Mar. 31, 2022.

(30) Foreign Application Priority Data

Apr. 19, 2021     (JP) ................................. 2021-070343

(51) Int. Cl.
    E05B 83/34 (2014.01)
    B60K 15/05 (2006.01)
(52) U.S. Cl.
    CPC .............. E05B 83/34 (2013.01); B60K 15/05 (2013.01); *B60K 2015/0576* (2013.01)
(58) Field of Classification Search
    CPC .... B60K 2015/0561; B60K 2015/0576; B60K 2015/0584; B60K 2015/0515; B60K 2015/053; B60K 15/05; E05B 83/34
    See application file for complete search history.

(56) References Cited

U.S. PATENT DOCUMENTS 9,950,615 B2 *  4/2018  Horikawa ............... E05B 83/34
2014/0251036 A1    9/2014  Ishiguro
                (Continued)

FOREIGN PATENT DOCUMENTS

JP        2014-173422        9/2014
JP        2020122335 A  *  8/2020  ............. E05B 83/34
                (Continued)

OTHER PUBLICATIONS

Computer Generated Translation for JP 2020122335 A, Generated on Jul. 27, 2025, https://worldwide.espacenet.com/patent/ (Year: 2025).*

(Continued)

*Primary Examiner* — Alyson M Merlino
(74) *Attorney, Agent, or Firm* — Amin, Turocy & Watson, LLP

(57)     ABSTRACT

A forward/backward movement device includes: a case; a forward/backward member; a biasing member that biases the forward/backward member; a moving member that is housed in the case and moves between a first position where the forward/backward member is capable of moving forward by a biasing force generated by the biasing member and a second position where the forward movement of the forward/backward member is stopped; and a restricting member that restricts a movement of the moving member by moving to a position for restricting the moving member while a lid is open, in which the restricting member restricts a movement of the moving member from the first position to the second position in a case where the forward/backward member moves backward while the lid is open.

9 Claims, 11 Drawing Sheets

(56)          References Cited

U.S. PATENT DOCUMENTS

2019/0184819 A1 * 6/2019 Kato ...................... E05B 83/34
2021/0172214 A1 * 6/2021 Kim ........................ E05B 83/34
2021/0372172 A1 * 12/2021 Tanaka ................... E05B 83/34
2022/0154508 A1 * 5/2022 Yoshimoto ............. E05B 83/34

FOREIGN PATENT DOCUMENTS

WO       WO-2019088183 A1 *   5/2019   ........... E05C 19/022
WO       WO-2020158816 A1 *   8/2020   ............. E05B 83/34

OTHER PUBLICATIONS

International Search Report and Written Opinion for International
Application No. PCT/JP2022/016433 mailed on May 17, 2022, 8
pages.

* cited by examiner

1A

1A

RECIPROCAL MOVEMENT DEVICE

CROSS-REFERENCE TO RELATED APPLICATIONS

This application is a Continuation of PCT International Application No. PCT/JP2022/016433 filed on Mar. 31, 2022 which claims the benefit of priority from Japanese Patent Application No. 2021-070343 filed on Apr. 19, 2021, the entire contents of both of which are incorporated herein by reference.

TECHNICAL FIELD

The present invention relates to a forward/backward movement device.

BACKGROUND ART

Patent Literature (hereinafter, referred to as PTL) 1 discloses a forward/backward movement device including a moving forward/backward member (hereinafter, referred to as forward/backward member) for opening and closing a fuel lid. The forward/backward movement device disclosed in PTL 1 is a device that opens and closes a fuel lid by moving a pushrod forward and backward, which is a forward/backward member.

When the fuel lid is switched from an open state to a closed state, the fuel lid is pushed to move to the closing direction, and the pushrod placed in the protruding position is pushed by the fuel lid and moves to the pushed-in position.

This forward/backward movement device is provided with a locking mechanism for restricting the forward/backward movement of the pushrod. This locking mechanism restricts the pushrod so as not to move forward and backward by securing the pushrod when the pushrod moves to the pushed-in position.

The locking mechanism restricts the forward/backward movement of the pushrod, so that the pushrod does not move forward when the closed-state fuel lid is operated to open, thereby preventing the fuel lid from opening.

CITATION LIST

Patent Literature

PTL 1
Japanese Patent Application Laid-Open No. 2014-173422

SUMMARY OF INVENTION

Technical Problem

There is however a problem with the forward/backward movement device disclosed in PTL 1 in that, in a case where only the pushrod is pushed to move backward by mischief or the like when the fuel lid is open, the pushrod moves to the pushed-in position and is locked by the locking mechanism.

An object of the present invention is to provide a forward/backward movement device capable of preventing a forward/backward member from being locked by mischief or the like.

Solution to Problem

A forward/backward movement device of the present invention includes: a case; a forward/backward member that moves forward in a direction from an inside of the case to an outside thereof, or moves backward in a direction opposite to the direction, the forward/backward member including one end side housed in the case and another end side protruding from the case; a biasing member that biases the forward/backward member; a moving member that is housed in the case and moves between a first position where the forward/backward member is capable of moving forward by a biasing force generated by the biasing member and a second position where the forward movement of the forward/backward member is stopped; and a restricting member that restricts a movement of the moving member by moving to a position for restricting the moving member while a lid is open, in which the restricting member restricts a movement of the moving member from the first position to the second position in a case where the forward/backward member moves backward while the lid is open.

Advantageous Effects of Invention

According to the present invention, it is possible to obtain a forward/backward movement device capable of preventing a forward/backward member from being locked by mischief or the like.

BRIEF DESCRIPTION OF DRAWINGS

FIG. 12 illustrates a state of forward/backward movement device 1A when fuel lid 120 is pushed in;

FIG. 14 illustrates a state of forward/backward movement device 1A when fuel lid 120 is pushed in;

FIG. 16 illustrates a state of forward/backward movement device 1A when only forward/backward member 11 is pushed in;

FIG. 18 is a diagram for describing the operation of forward/backward movement device 1A when only pushing force transmission member 83*a* is pushed in.

DESCRIPTION OF EMBODIMENTS

Hereinafter, an embodiment of the present invention will be described in detail with reference to the drawings.

[Configuration of Opening and Closing Device 100]

Figure 1:
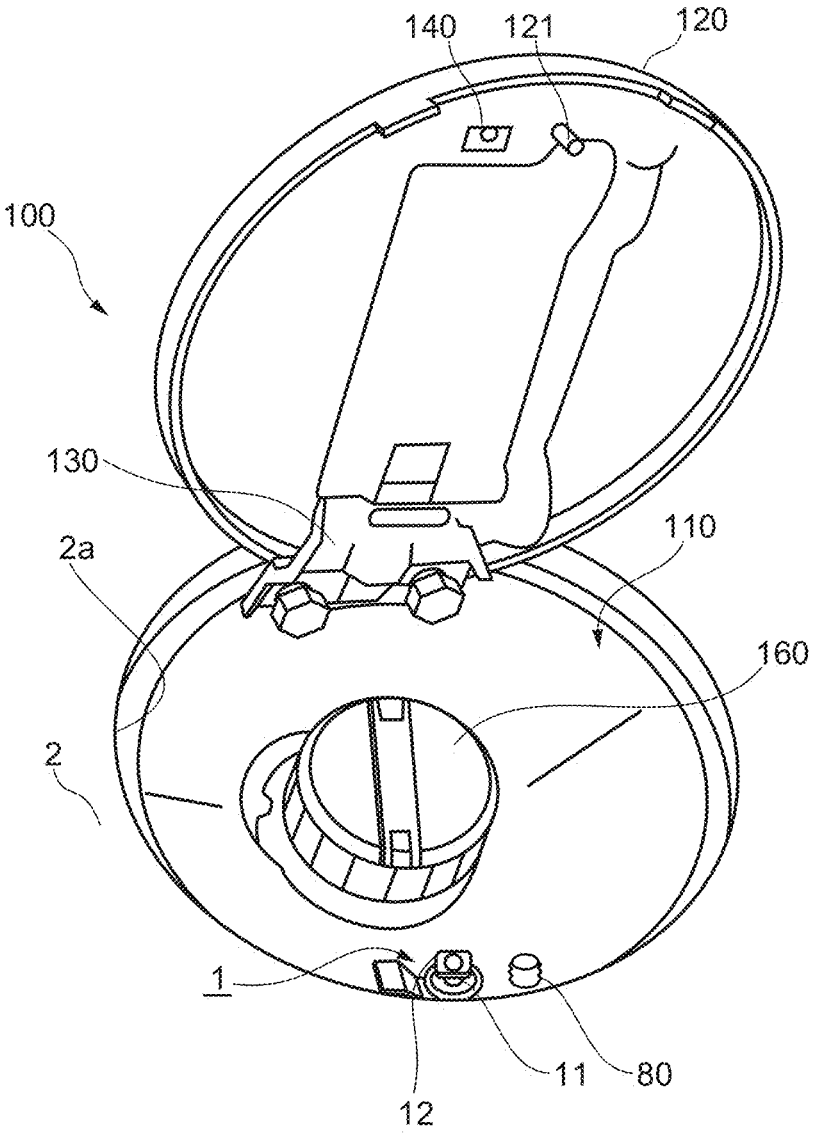
FIG. 1 illustrates an exemplary configuration of opening and closing device 100 including forward/backward movement device 1 according to an embodiment of the present invention.
Figure 2:
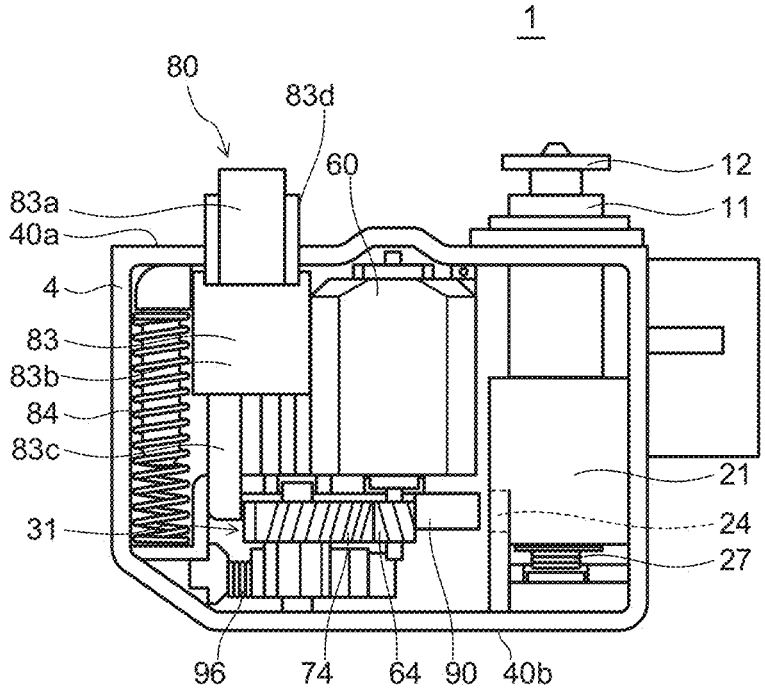
FIG. 2 illustrates an exemplary configuration of forward/backward movement device 1 according to the embodiment of the present invention.

FIG. 1 illustrates an exemplary configuration of opening and closing device 100 including forward/backward movement device 1 according to an embodiment of the present invention, and FIG. 2 illustrates an exemplary configuration of forward/backward movement device 1 according to the embodiment of the present invention.

Opening and closing device 100 is a device for opening and closing fuel lid 120, which is a lid for blocking oil filler opening portion 2*a* of vehicle body 2. Opening and closing device 100 includes forward/backward movement device 1 according to the embodiment of the present invention. Note that details of the configuration of forward/backward movement device 1 will be described later.

Opening and closing device 100 includes body portion 110 attached to oil filler opening portion 2*a* of vehicle body 2, fuel lid 120, hinge 130 that rotatably supports fuel lid 120, and forward/backward movement device 1.

Body portion 110 configures an oil filler chamber surrounding an oil filler pipe, for example. Note that the oil filler opening formed at the end of the oil filler pipe is blocked by screw cap 160.

Forward/backward member 11 is a member for opening and closing fuel lid 120. Lid securing portion 12 is provided at the end of forward/backward member 11.

In opening and closing device 100 configured as described above, when fuel lid 120 is closed, lid secured portion 140 of fuel lid 120 comes into contact with forward/backward member 11. At this time, lid securing portion 12 provided in forward/backward member 11 is inserted into the inside of lid secured portion 140.

When fuel lid 120 is pushed in in this state, forward/backward member 11 moves backward to the inside of vehicle body 2. The backward movement means that forward/backward member 11 moves from the outside of a case to be described later to the inside of the case.

Further, when forward/backward member 11 moves backward, lid securing portion 12 rotates, and lid securing portion 12 is secured to lid secured portion 140. When lid securing portion 12 is secured to lid secured portion 140, forward/backward member 11 is placed at the backward position.

The backward position is a stop position of forward/backward member 11 that has moved backward. The backward position is also a position where fuel lid 120 is held in the closed state.

Limiting member 90 to be described later is inserted into the recessed portion of forward/backward-member-side member 21 in this state, and therefore, the movement of forward/backward member 11 held by the forward/backward-member-side member is restricted, that is, forward/ backward member 11 is locked. Accordingly, fuel lid 120 is locked while oil filler opening portion 2*a* is closed.

When the locking of forward/backward member 11 by the above-described limiting member is released to open fuel lid 120, forward/backward member 11 moves forward to the outside of vehicle body 2. The forward movement means that forward/backward member 11 moves from the inside of the case to be described later toward the outside of the case.

At this time, lid securing portion 12 of forward/backward member 11 rotates, and the securing of lid securing portion 12 to lid secured portion 140 is released. Thus, lid securing portion 12 comes off from lid secured portion 140, and fuel lid 120 can be opened.

Pressing force transmission portion 80 includes a pushing force transmission member, a guide portion, and the like. Details of the pushing force transmission member, the guide portion, and the like will be described later.

[Configuration of Forward/Backward Movement Device 1]

Figure 3:
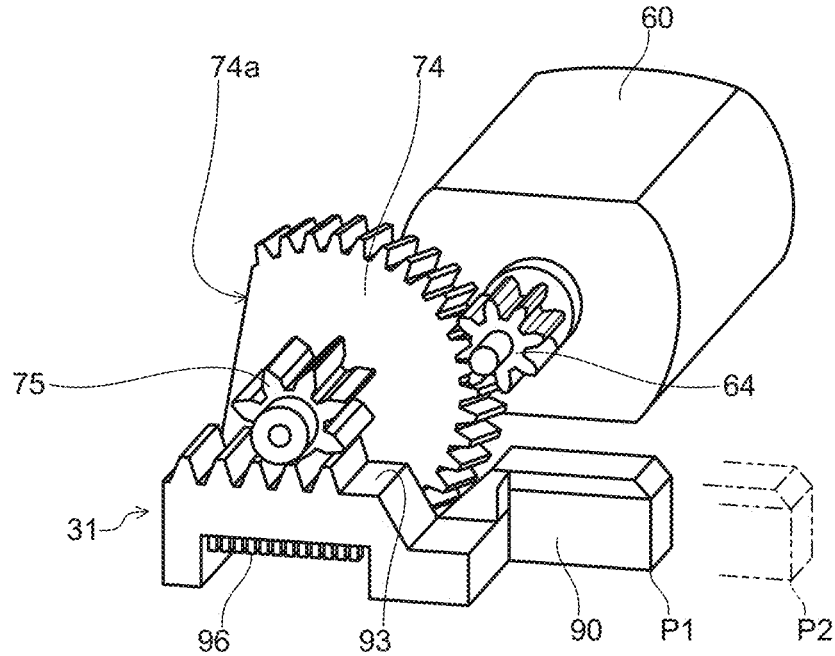
FIG. 3 is a perspective view of moving member 31 included in forward/backward movement device 1.

Next, with reference to FIGS. 2 and 3, a configuration of forward/backward movement device 1 will be described. FIG. 2 illustrates an exemplary configuration of forward/backward movement device 1, and FIG. 3 is a perspective view of moving member 31 included in forward/backward movement device 1.

Forward/backward movement device 1 illustrated in FIG. 2 is a device that moves forward/backward member 11 forward or backward with respect to case 4. Forward/backward movement device 1 includes case 4, forward/backward member 11, forward/backward-member-side member 21, biasing member 27, moving member 31, driving portion 60, restricting portion 83, and biasing member 84.

[Forward/Backward Member 11]

Forward/backward member 11 is a member having a columnar or cylindrical shape that can move forward and backward with respect to case 4. Forward/backward member 11 is inserted into a through hole (not illustrated) formed in front-side wall portion 40*a*.

Forward/backward member 11 moves between a forward position where forward/backward member 11 has moved forward with respect to case 4 and a backward position where forward/backward member 11 has moved backward with respect to case 4. The forward position is a stop position of forward/backward member 11 that has moved forward. The forward position is also a position of forward/backward member 11 when the securing of lid securing portion 12 to lid secured portion 140 illustrated in FIG. 1 is released.

[Forward/Backward-Member-Side Member 21]

Forward/backward-member-side member 21 is a member that restricts the forward position and the backward position of forward/backward member 11 by moving in case 4 while rotatably holding forward/backward member 11. Forward/backward-member-side member 21 is placed in an area between front-side wall portion 40*a* and back-side wall portion 40*b* of case 4.

Forward/backward-member-side member 21 restricts the movement of forward/backward member 11 in the forward direction by being in contact with the front-side wall portion 40*a*. Further, forward/backward-member-side member 21 restricts the movement of forward/backward member 11 in the backward direction by being in contact with back-side wall portion 40*b*.

Forward/backward-member-side member 21 includes recessed portion 24, and limiting member 90 engages with recessed portion 24, so that the forward movement of forward/backward member 11 is restricted. Details of limiting member 90 will be described later. Note that, in forward/backward-member-side member 21, a fitting hole may be provided instead of recessed portion 24. The fitting hole is a through hole with which limiting member 90 engages to restrict the forward movement of forward/backward member 11.

[Biasing Member 27]

Biasing member 27 is a coil spring that generates a biasing force for moving forward/backward member 11 placed at the backward position toward the forward position.

Biasing member 27 is, for example, placed inside case 4 in an area between forward/backward-member-side member 21 and back-side wall portion 40*b*. One end of biasing member 27 faces an end surface of forward/backward-member-side member 21 on a back-side wall portion 40*b* side, and the other end of biasing member 27 faces back-side wall portion 40*b* of case 4.

Note that biasing member 27 is not limited to a coil spring, and may be any elastic member that generates a biasing force for moving forward/backward member 11, and may be a leaf spring or the like.

[Restricting Portion 83]

Restricting portion 83 includes pushing force transmission member 83*a*, internal member 83*b*, and restricting member 83*c*.

[Pushing Force Transmission Member 83*a*]

Pushing force transmission member 83*a* is a member for transmitting a pushing force when fuel lid 120 is closed to restricting member 83*c*.

Pushing force transmission member 83*a* is formed in a columnar shape that can be inserted into guide portion 83*d* formed on front-side wall portion 40*a* of case 4. Pushing force transmission member 83*a* is fixed to internal member 83*b*, and protrudes from internal member 83*b* to the outside of case 4 via guide portion 83*d* formed on front-side wall portion 40*a* of case 4.

[Internal Member 83*b*]

Internal member 83*b* is a member that is movably placed inside case 4. Internal member 83*b* is placed, for example, on a guiding rail provided inside case 4.

Internal member 83*b* moves from front-side wall portion 40*a* to back-side wall portion 40*b* when fuel lid 120 illustrated in FIG. 1 is closed, and moves in a direction from back-side wall portion 40*b* to front-side wall portion 40*a* when fuel lid 120 is open.

[Biasing Member 84]

Biasing member 84 is a coil spring that generates a biasing force for moving internal member 83*b* toward front-side wall portion 40*a* of case 4.

For example, biasing member 84 is placed inside case 4 in an area opposite to the driving portion 60 side of internal member 83*b* with reference to restricting portion 83. Note that biasing member 84 is not limited to a coil spring, as long as biasing member 84 is an elastic member that generates a biasing force for moving internal member 83*b*, and may be a leaf spring or the like.

[Restricting Member 83*c*]

Restricting member 83*c* is a member that moves together with pushing force transmission member 83*a* and restricts the movement of limiting member 90 included in moving member 31 when pushing transmission member 83*a* is pushed into case 4 as a result of fuel lid 120 being positioned in a closed state. Restricting member 83*c* extends from internal member 83*b* toward back-side wall portion 40*b* of case 4. Details of the configuration of restricting member 83*c* will be described later.

[Driving Portion 60]

Driving portion 60 is a motor that generates a driving force for moving limiting member 90. Rotation gear 64 is connected to a rotation shaft of driving portion 60.

[Moving Member 31]

As illustrated in FIG. 3, moving member 31 includes rotation gear 74, rack gear 93, limiting member 90, and biasing member 96.

[Rotation Gear 74]

Rotation gear 74 is an exemplary rotational force transmission member that transmits a rotational force of driving portion 60 by meshing with rotation gear 64 and moves limiting member 90 by the rotational force. Rotation gear 74 is provided with pinion gear 75 coaxially with rotation gear 74. Pinion gear 75 meshes with rack gear 93 formed on limiting member 90.

Rotation gear 74 is a rotational force transmission member that transmits a rotational force by a motor or manual operation and moves moving member 31 by the rotational force. Rotational gear 74 is, for example, a gear in which a partial region of the annular gear is cut by D-cutting. D-cut surface 74*a* is formed on the cut portion of rotation gear 74.

The end portion of restricting member 83*c* illustrated in FIG. 2 is in contact with D-cut surface 74*a* or is separated from D-cut surface 74*a*. When the end portion of restricting member 83*c* is not in contact with D-cut surface 74*a*, rotation gear 74 can rotate, but when the end portion of restricting member 83*c* is in contact with D-cut surface 74*a*, the rotation of rotation gear 74 is blocked by restricting member 83*c*.

[Biasing Member 96]

Biasing member 96 is a coil spring that generates a biasing force for moving limiting member 90 placed at first position P1 toward second position P2.

Biasing member 96 is, for example disposed inside case 4 in an area between limiting member 90 and a protrusion formed inside back-side wall portion 40*b* of case 4. One end of biasing member 96 faces limiting member 90, and the other end of biasing member 96 faces a protrusion formed on back-side wall portion 40*b* of case 4.

Note that biasing member 96 is not limited to a coil spring as long as biasing member 96 is an elastic member that generates a biasing force for moving forward/backward member 11, and may be a leaf spring or the like.

[Limiting Member 90 and Rack Gear 93]

Limiting member 90 is housed inside case 4 illustrated in FIG. 2 and moves between first position P1 and second position P2. Limiting member 90 can move from first position P1 toward second position P2 by the biasing force generated by biasing member 96.

Note that limiting member 90 can move by a rotational force generated when a driving mechanism (not illustrated) is manually operated, a driving force of driving portion 60, and/or the like, in addition to by the biasing force generated by biasing member 96. At this time, limiting member 90 can also be configured to move to second position P2 by detecting that forward/backward member 11 is positioned at the backward position by detection means or the like.

Rack gear 93 is formed on limiting member 90. Rack gear 93 is a gear for converting a rotational motion into a linear motion.

Rotation gear 74 meshing with rack gear 93 via pinion gear 75 rotates, and limiting member 90 moves between first position P1 and second position P2.

First position P1 is a position at which forward/backward member 11 can move forward. When limiting member 90 is placed at first position P1, limiting member 90 does not engage with recessed portion 24 formed on forward/backward-member-side member 21. Therefore, forward/back-ward member 11 placed at the backward position can move forward by the biasing force generated by biasing member 27 illustrated in FIG. 1.

Second position P2 is a position at which the forward movement of forward/backward member 11 illustrated in FIG. 1 is stopped. Second position P2 is equal to the position when the end portion of limiting member 90 illustrated in FIG. 2 engages with recessed portion 24 of forward/back-ward-member-side member 21.

When limiting member 90 is placed at second position P2 as described above, limiting member 90 engages with recessed portion 24 formed on forward/backward-member-side member 21, and therefore, forward/backward member 11 stops at the backward position and cannot move forward.

[Operation of Forward/Backward Movement Device 1]

Next, with reference to FIGS. 4 to 7, the operation of forward/backward movement device 1 when fuel lid 120 is closed will be described. FIGS. 4 to 7 are diagrams for describing the operation of forward/backward movement device 1 when fuel lid 120 is closed.

Figure 4:
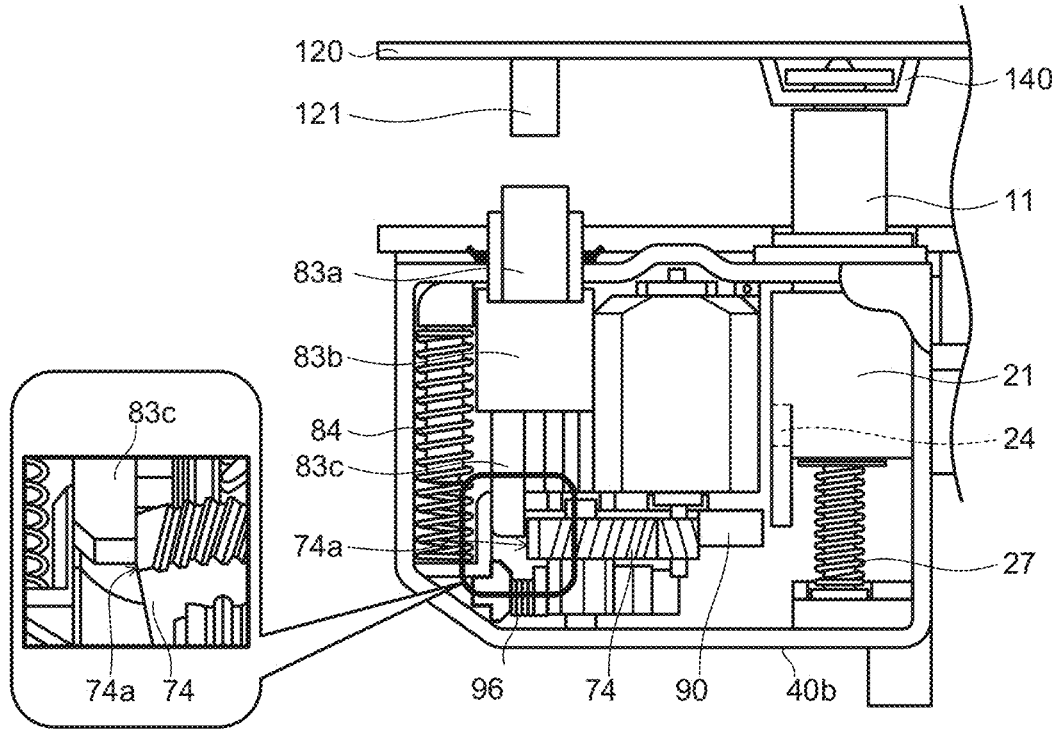
FIG. 4 is a diagram for describing the operation of forward/backward movement device 1 when fuel lid 120 is closed.

The diagram on the right side in FIG. 4 illustrates for-ward/backward movement device 1 before fuel lid 120 is pushed in. The diagram on the left side in FIG. 4 illustrates a state in which the end portion of restricting member 83*c* is in contact with D-cut surface 74*a* of rotation gear 74.

When fuel lid 120 is not pushed in, forward/backward member 11 is placed at the forward position by the biasing force of biasing member 27.

Further, internal member 83*b* is placed so as to push pushing force transmission member 83*a* to the outside of case 4 by the biasing force of biasing member 84. At this time, the end portion of restricting member 83*c* is in contact with D-cut surface 74*a* of rotation gear 74.

Thus, the rotation of rotation gear 74 is limited, and thus the movement of limiting member 90 from first position P1 to second position P2 illustrated in FIG. 3 is restricted. Therefore, the end portion of limiting member 90 is placed at a position away from forward/backward-member-side member 21.

Figure 5:
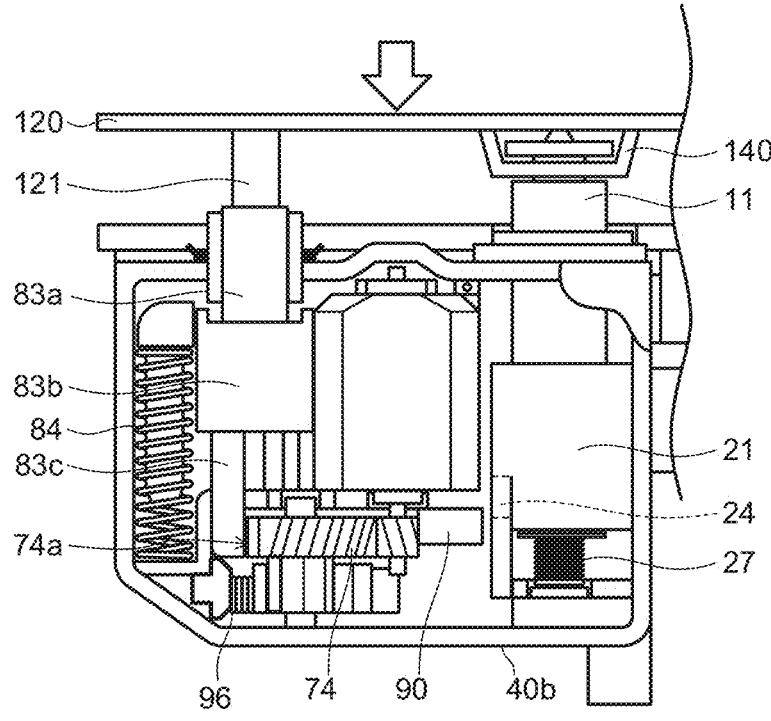
FIG. 5 is another diagram for describing the operation of forward/backward movement device 1 for closing fuel lid 120.

In this state, when fuel lid 120 is pushed in as illustrated in FIG. 5, forward/backward member 11 moves in the backward direction against the biasing force of biasing member 27. FIG. 5 illustrates forward/backward movement device 1 when fuel lid 120 is pushed in.

When fuel lid 120 is slightly pushed in, forward/backward member 11 start to move in the backward direction against the biasing force of biasing member 27.

At this time, pushing force transmission member 83*a* is pushed in by protrusion 121 of fuel lid 120, and then the end portion of restricting member 83*c* moves so as to be closer to back-side wall portion 40*b* of case 4.

Figure 6:
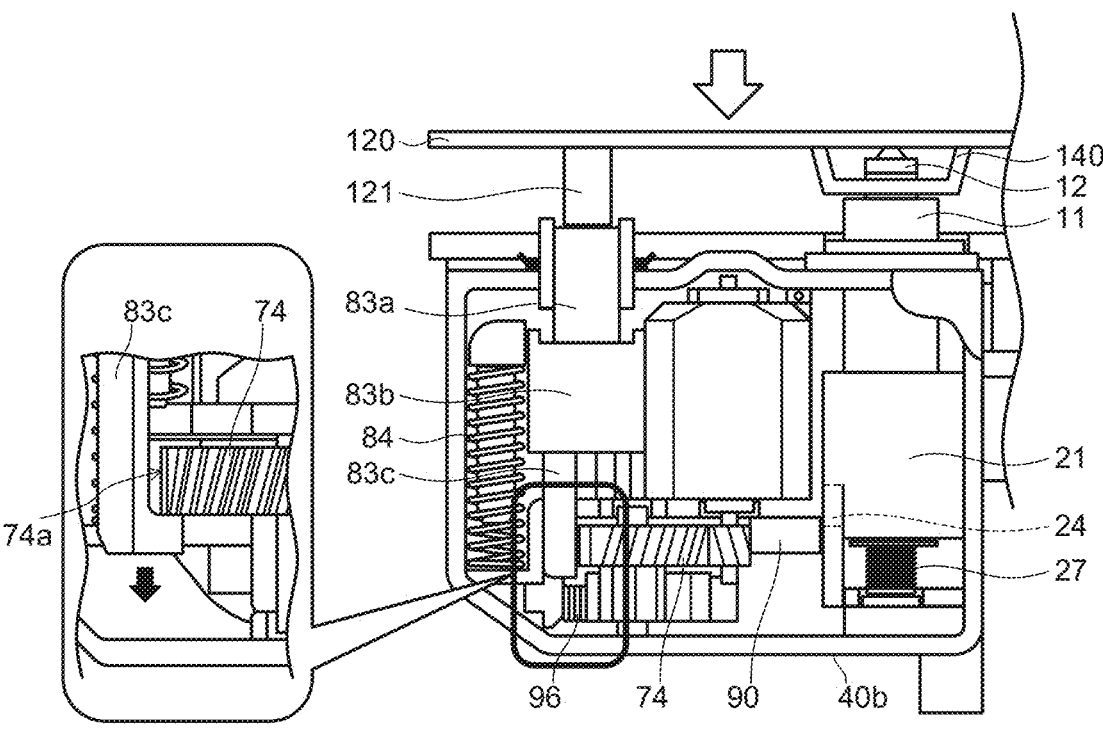
FIG. 6 is still another diagram for describing the operation of forward/backward movement device 1 for closing fuel lid 120.

As illustrated in FIG. 6, when fuel lid 120 is further pushed in, forward/backward member 11 further moves backward. The diagram on the right side in FIG. 6 illustrates forward/backward movement device 1 when fuel lid 120 is pushed in. The diagram on the left side in FIG. 6 is a perspective view of a state in which the end portion of restricting member 83*c* is in non-contact with D-cut surface 74*a* of rotation gear 74.

When fuel lid 120 is pushed in as described above, recessed portion 24 of forward/backward-member-side member 21 approaches limiting member 90. Further, the end portion of restricting member 83*c* comes even closer to back-side wall portion 40*b* of case 4.

As illustrated herein in the diagram on the left side in FIG. 6, the end portion of restricting member 83*c* is formed in a hook-like shape. Thus, fuel lid 120 is pushed in and moves the hook-like end portion that is in contact with D-cut surface 74*a* to prevent the rotation of rotation gear 74, and therefore the end portion is in non-contact with D-cut surface 74*a* of rotation gear 74.

As a result, rotation gear 74 becomes rotatable, and the movement of limiting member 90 is not restricted. Thus, limiting member 90 moves forward to forward/backward-member-side member 21 by the biasing force of biasing member 96 or the rotational force of driving portion 60.

Accordingly, as illustrated in the diagram on the right side in FIG. 6, the end portion of limiting member 90 comes into contact with forward/backward-member-side member 21.

Figure 7:
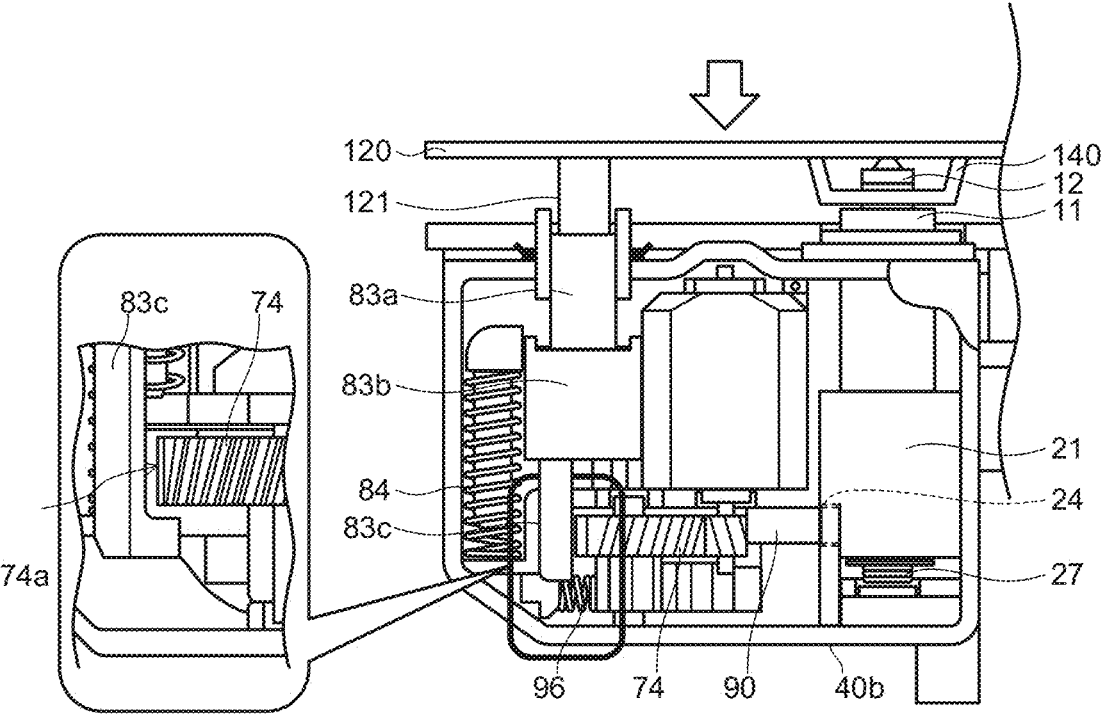
FIG. 7 is still another diagram for describing the operation of forward/backward movement device 1 for closing fuel lid 120.

Further, when fuel lid 120 is pushed in, forward/backward member 11 reaches the backward position as illustrated in FIG. 7. The diagram on the right side in FIG. 7 illustrates forward/backward member 11 that has reached the backward position. The diagram on the left side in FIG. 7 illustrates a state in which the end portion of restricting member 83*c* is further away from rotation gear 74.

When forward/backward member 11 reaches the back-ward position as illustrated in FIG. 7, the end portion of limiting member 90 is inserted into recessed portion 24 of forward/backward-member-side member 21. Therefore, limiting member 90 engages with forward/backward-mem-ber-side member 21.

At this time, because limiting member 90 is biased by biasing member 96, the engagement state of limiting mem-ber 90 with forward/backward-member-side member 21 is maintained without the power supply to driving portion 60. Thus, the movement of forward/backward member 11 in the forward/backward direction is restricted, which prevents fuel lid 120 from opening.

Further, because the end portion of restricting member 83*c* is away from rotation gear 74 as illustrated in the diagram on the left side in FIG. 7, limiting member 90 can be moved.

Therefore, when forward/backward member 11 is moved from the backward position to the forward position, that is, when fuel lid 120 is moved from the closed position to the open position, limiting member 90 can be away from the side of forward/backward member 11 by driving driving portion 60 or by a driving mechanism (not illustrated) by which the rotational force is manually generated.

As a result, the end portion of limiting member 90 is pulled out from recessed portion 24, and the movement restricted state of forward/backward member 11 in the forward/backward direction is released. Forward/backward member 11 that is released from the movement restricted state as described above moves in the forward direction by the biasing force of biasing member 27. At this time, forward/backward member 11 moves in the axial direction of forward/backward member 11 while rotating with respect to case 4.

Then, lid securing portion 12 provided at the end of forward/backward member 11 also rotates by the rotation of forward/backward member 11, and the securing of lid secur-ing portion 12 to lid secured portion 140 is released. Further, forward/backward member 11 pushes up fuel lid 120 to reach the forward position. Thus, fuel lid 120 is open.

Next, with reference to FIGS. 8 and 9, the operation of forward/backward movement device 1 when forward/back-ward member 11 is pushed by mischief will be described.

Figure 8:
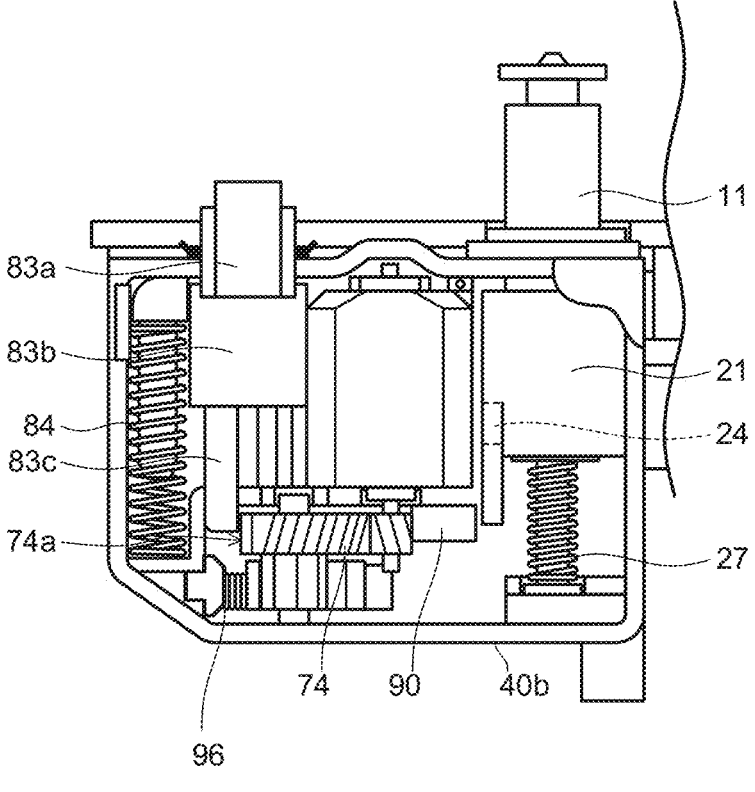
FIG. 8 is a diagram for describing the operation of forward/backward movement device 1 when forward/backward member 11 is pushed while fuel lid 120 is open.
Figure 9:
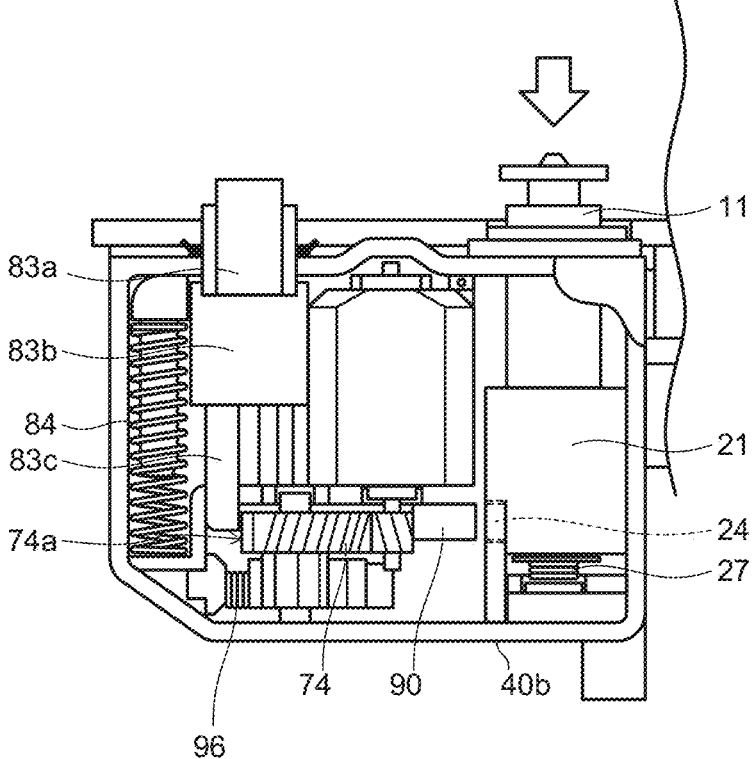
FIG. 9 is another diagram for describing the operation of forward/backward movement device 1 when forward/backward member 11 is pushed while fuel lid 120 is open.

FIGS. 8 and 9 are diagrams for describing the operation of forward/backward movement device 1 when forward/backward member 11 is pushed while fuel lid 120 is open. FIG. 8 illustrates a state of forward/backward movement device 1 before forward/backward member 11 is pushed. FIG. 9 illustrates a state in which forward/backward member 11 pushed by a human finger, for example, is placed at the backward position.

When forward/backward member 11 is not pushed as illustrated in FIG. 8, the end portion of limiting member 90 is placed at a position away from forward/backward-member-side member 21, similarly to the state illustrated in FIG. 4.

On the other hand, when forward/backward member 11 is pushed by mischief or the like and is positioned at the backward position as illustrated in FIG. 9, recessed portion 24 of forward/backward-member-side member 21 is positioned in front of the end portion of limiting member 90.

However, as illustrated in FIG. 9, when pushing force transmission member 83*a* is not pushed in and only forward/backward member 11 is pushed in, the end portion of restricting member 83*c* is in contact with D-cut surface 74*a* of rotation gear 74.

The biasing force of biasing member 96 biasing limiting member 90 to the second position is transmitted to rotation gear 74 via rack gear 93 of limiting member 90 and pinion gear 75, and therefore, a force that causes rotation gear 74 to rotate to a direction in which limiting member 90 moves to the second position acts. However, since D-cut surface 74*a* is in contact with the end portion of restricting member 83*c*, the rotation of rotation gear 74 is restricted. Thus, even though limiting member 90 is biased to the second position by biasing member 96, the movement of limiting member 90 from first position P1 to second position P2 is restricted by the contact between restricting member 83*c* and rotation gear 74. Thus, limiting member 90 is not inserted into recessed portion 24 of forward/backward-member-side member 21, so that forward/backward member 11 can move forward.

As described above, according to forward/backward movement device 1 according to the embodiment of the present invention, providing restricting member 83*c* that restricts the movement of moving member 31 allows forward/backward member 11 to move forward and backward when only forward/backward member 11 is operated to move backward when fuel lid 120 is open. Therefore, it is possible to prevent the forward/backward member from being locked.

Note that the shape of the end portion of restricting member 83*c* is not limited to a hook-like shape, and may be any shape as long as the shape can restrict the rotation of rotation gear 74.

For example, spur teeth is provided at the end portion of restricting member 83*c* and an annulus gear including spur teeth is employed instead of D-cut rotation gear 74, so that the spur teeth of restricting member 83*c* engages with rotation gear 74, which prevents the rotation of rotation gear 74. Further, the engagement between the spur teeth of restricting member 83*c* and rotation gear 74 can be released by moving restricting member 83*c*, and thus rotation gear 74 can rotate.

Further, with this configuration, it is possible to omit the D-cut processing for rotation gear 74, and it is possible to manufacture forward/backward movement device 1 with a general-purpose component.

Note that, although the exemplary configuration for locking restricting member 83*c* with rotation gear 74 has been described in the embodiment of the present invention, a configuration other than the exemplary configuration may be employed as long as the movement of limiting member 90 can be restricted.

Further, in the embodiment of the present invention, although the exemplary configuration has been described in which pushing force transmission member 83*a* is pushed by fuel lid 120 to move restricting member 83*c*, but the exemplary configuration for moving restricting member 83*c* is not limited thereto. For example, a rack gear may be provided on restricting member 83*c*, a rotation gear meshing with the rack gear may be configured so as to rotate in accordance with the rotation of a hinge part of fuel lid 120, and restricting member 83*c* may move forward and backward in accordance with the opening and closing of fuel lid 120.

(Another Exemplary Configuration)

Hereinafter, another exemplary configuration of forward/backward movement device 1 illustrated in FIG. 2 will be described with reference to FIGS. 10 to 19.

Figures 10, 11:
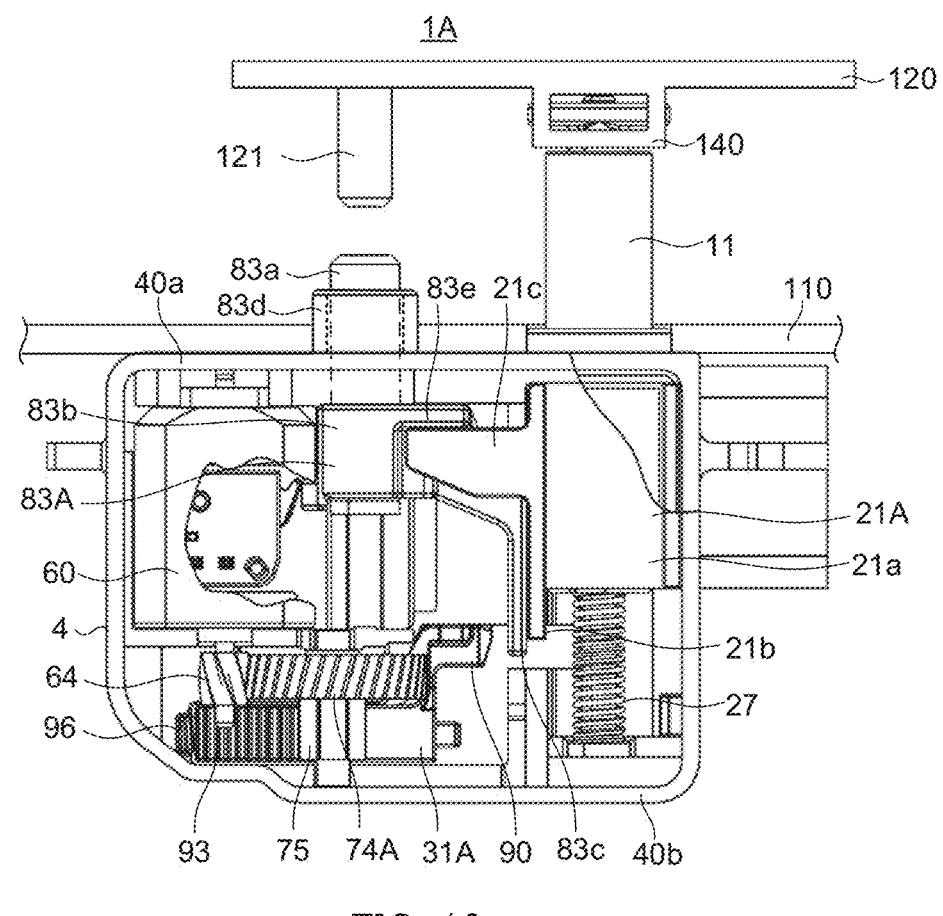
FIG. 10 is an exemplary configuration of forward/backward movement device 1A according to an embodiment of the present invention.
FIG. 11 is an enlarged view of a part of forward/backward movement device 1A illustrated in FIG. 10.

FIG. 10 is an exemplary configuration of forward/backward movement device 1A according to an embodiment of the present invention. FIG. 10 illustrates forward/backward movement device 1A before fuel lid 120 is pushed in. FIG. 11 is an enlarged view of a part of forward/backward movement device 1A illustrated in FIG. 10. FIG. 11 illustrates a positional relationship between the end portion of limiting member 90, the end portion of restricting member 83*c*, and the end portion of engaged member 21*b* before fuel lid 120 is pushed in.

As illustrated in FIG. 10, forward/backward movement device 1A includes case 4, forward/backward member 11, forward/backward-member-side member 21A, biasing member 27, moving member 31A, driving portion 60, and restricting portion 83A.

[Forward/Backward-Member-Side Member 21A]

Forward/backward-member-side member 21A is a member for restricting the forward position of forward/backward member 11. Forward/backward-member-side member 21A includes restricting member 21*a*, engaged member 21*b*, and engaged member 21*c*.

[Restricting Member 21a]

Restricting member 21*a* moves in case 4 while rotatably holding forward/backward member 11, thereby restricting the forward position of forward/backward member 11.

Restricting member 21*a* is placed in an area between front-side wall portion 40*a* and back-side wall portion 40*b* of case 4. Restricting member 21*a* restricts the forward movement of forward/backward member 11 by being in contact with front-side wall portion 40*a*.

Note that forward/backward movement device 1A may be configured so that the movement of forward/backward member 11 in the forward direction is restricted by engaging member 83*e* being in contact with front-side wall portion 40*a* while engaged member 21*c* is engaged with engaging member 83*e*. Respective configurations of engaged member 21*c* and engaging member 83*e* will be described in detail later.

[Engaged Member 21b]

Engaged member 21*b* restricts the forward movement of restricting member 21*a* by limiting member 90 engaging with engaged member 21. Thus, a recessed portion with which limiting member 90 engages is formed on engaged member 21*b*. Details of the recessed portion will be described later.

Engaged member 21*b* extends from restricting member 21*a* toward back-side wall portion 40*b*. Engaged member 21*b* is provided adjacently to restricting member 83*c* and parallel to restricting member 83*c*.

[Engaged Member 21c]

When only pushing force transmission member 83a is pushed in so as to move backward, engaged member 21c engages with engaging member 83e of restricting portion 83A. Engaged member 21c extends from restricting member 21a toward internal member 83b. Further, when forward/backward member 11 moves in the forward direction from the backward position, engaged member 21c is engaged with engaging member 83e of restricting portion 83A, so that engaging member 83e moves pushing force transmission member 83a to the forward position.

[Moving Member 31A]

Moving member 31A includes rotation gear 74A, rack gear 93, limiting member 90, and biasing member 96.

[Back-Side Wall Portion 40b]

Back-side wall portion 40b restricts the movement of forward/backward member 11 in the backward direction by being in contact with an end portion of engaged member 21b of forward/backward member 11 on a back-side wall portion 40b side when forward/backward member 11 moves in the backward direction.

[Rotation Gear 74A]

Rotation gear 74A is an annular gear. D-cut surface 74a illustrated in FIG. 3 is not formed on rotation gear 74A. Rotation gear 74A is a rotational force transmission member that transmits a rotational force by a motor or manual operation and moves moving member 31 by the rotational force. Note that, instead of rotation gear 74A, rotation gear 74 illustrated in FIG. 3 may be used for moving member 31A.

Rotation gear 74A is an exemplary rotational force transmission member that transmits the rotational force of driving portion 60 by meshing with rotation gear 64 and moves limiting member 90 by the rotational force. Rotation gear 74A is provided with pinion gear 75 coaxially with rotation gear 74. Pinion gear 75 meshes with rack gear 93 formed on limiting member 90.

[Restricting Portion 83A]

Restricting portion 83A includes pushing force transmission member 83a, internal member 83b, restricting member 83c, and engaging member 83e.

[Engaging Member 83e]

Engaging member 83e engages with engaged member 21c of forward/backward-member-side member 21A when only pushing force transmission member 83a is pushed so as to move backward. Engaging member 83e extends from internal member 83b toward restricting member 21a.

By driving driving portion 60 or by driving a driving mechanism (not illustrated) for manually generating a rotational force, the end portion of limiting member 90 moves in a direction apart from engaged member 21b against the biasing force of biasing member 96, and faces the end portion of restricting member 83c at a position apart from the end portion of restricting member 83c by a predetermined distance as illustrated in FIG. 11. Thus, the engagement of engaged member 21b and limiting member 90 is released, and forward/backward member 11 rotates and moves in the forward direction by a biasing force of biasing member 27, so that fuel lid 120 is in an open state. The position of restricting member 83c is equal to the first position illustrated in FIG. 3. When forward/backward member 11 is held in the forward position, limiting member 90 is biased on an engaged member 21b side by the biasing force of biasing member 96 and comes into contact with a side surface of an end portion of engaged member 21b on a back-side wall portion 40b side. At this time, limiting member 90 is not engaged with a recessed portion of engaged member 21b, and thus forward/backward member 11 can move in the backward direction. The recessed portion of engaged member 21b will be described in detail later.

The end portion of restricting member 83c is formed in a hook-like shape. Further, recessed portion 83c1 is formed on restricting member 83c.

Next, with reference to FIGS. 12 and 13, the state of forward/backward movement device 1A when fuel lid 120 is pushed in will be described.

Figure 12:
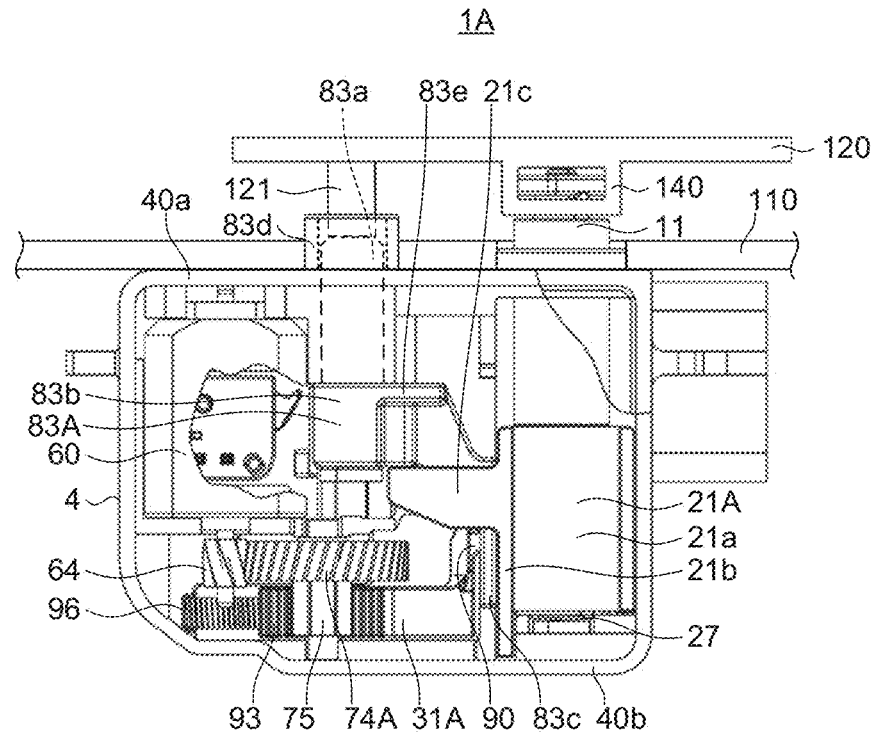
Figure 13:
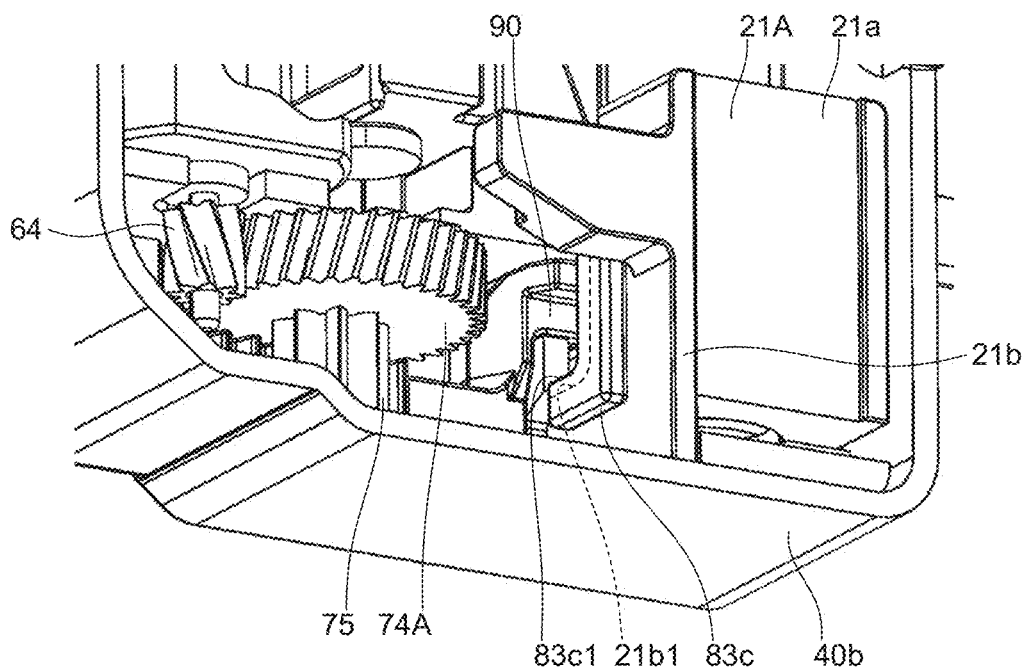
FIG. 13 is an enlarged view of a part of forward/backward movement device 1A illustrated in FIG. 12.

FIG. 12 illustrates a state of forward/backward movement device 1A when fuel lid 120 is pushed in, and the end portion of engaged member 21b on a back-side wall portion 40b side moves backward to a position of being in contact with back-side wall portion 40b of case 4. FIG. 13 is an enlarged view of a part of forward/backward movement device 1A illustrated in FIG. 12.

As illustrated in FIG. 12, when fuel lid 120 is pushed in, forward/backward member 11 moves in the backward direction against the biasing force of biasing member 27. Then, the end portion of engaged portion 21b moves backward until the end portion comes into contact with back-side wall portion 40b.

In this case, pushing force transmission member 83a is also pushed in by protrusion 121 of fuel lid 120, so that the end portion of restricting member 83c moves so as to be closer to back-side wall portion 40b of case 4. Thus, the recessed portion of engaged member 21b and recessed portion 83c1 formed on restricting member 83c moves in the backward direction to a position into which limiting member 90 can be inserted.

When the end portion of restricting member 83c approaches back-side wall portion 40b of case 4, the end portion of limiting member 90 pushed by the biasing force of biasing member 96 illustrated in FIG. 12 is inserted into recessed portion 83c1 formed on restricting member 83c.

Further, the end portion of restricting member 90 is inserted into recessed portion 21b1 formed on engaged member 21b after passing through recessed portion 83c1 of restricting member 83c. Note that the position of the end portion of limiting member 90 at this time is equal to the second position illustrated in FIG. 3.

Next, with reference to FIGS. 14 and 15, a state will be described in which forward/backward member 11 slightly moves in the forward direction by the biasing force of biasing member 27 after fuel lid 120 is pushed in.

Figure 14:
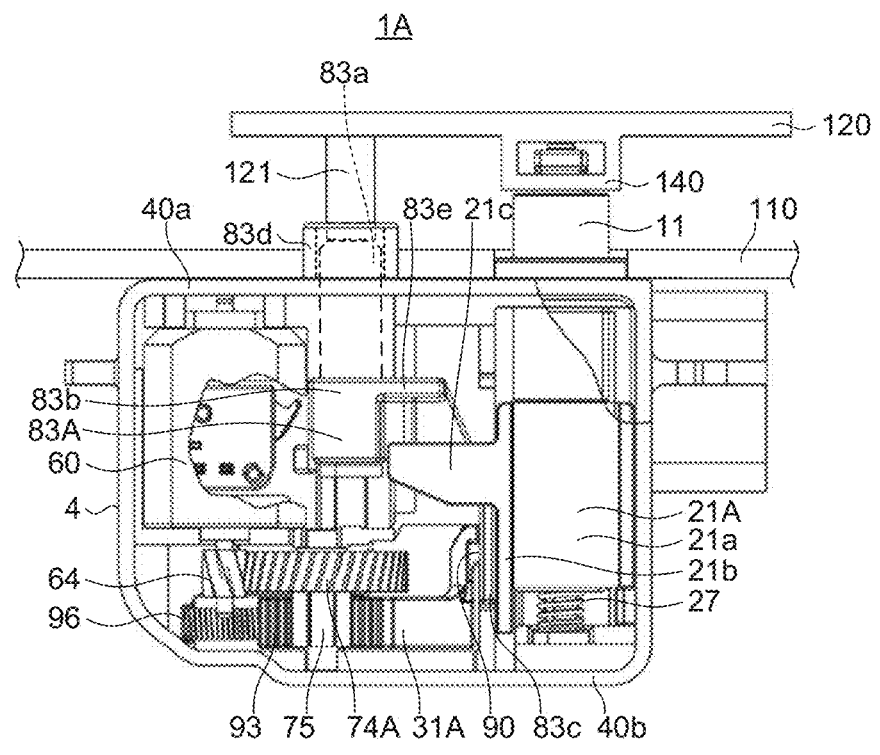
Figure 15:
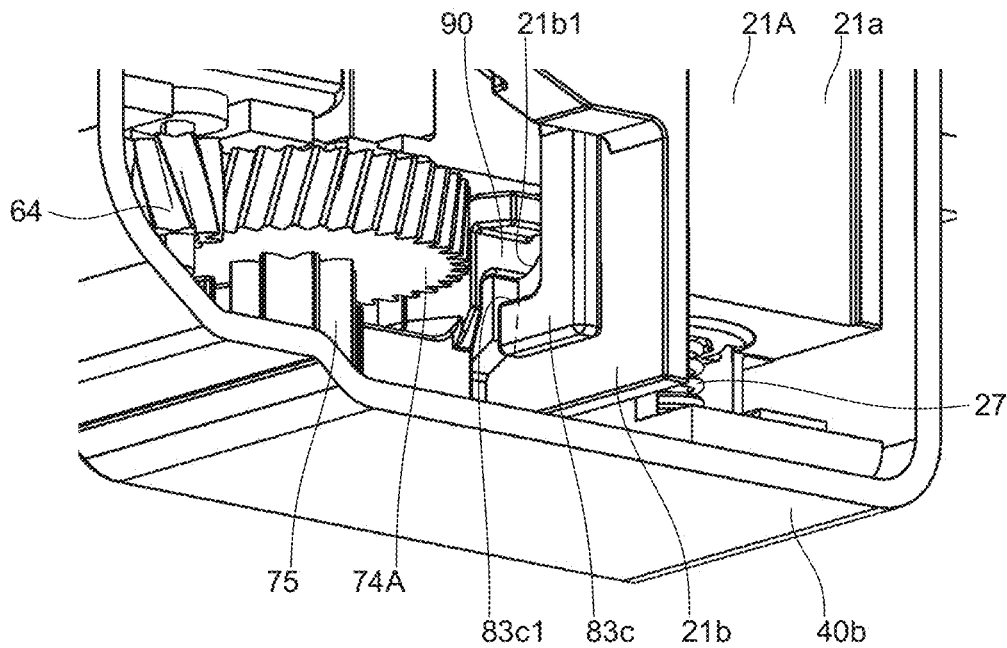
FIG. 15 is an enlarged view of a part of forward/backward movement device 1A illustrated in FIG. 14.

FIG. 14 illustrates a state of forward/backward movement device 1A when fuel lid 120 is pushed in, and FIG. 15 is an enlarged view of a part of forward/backward movement device 1A illustrated in FIG. 14.

When fuel lid 120 is completely pushed in, forward/backward member 11 attempts to move in the forward direction by the biasing force of biasing member 27, but the end portion of limiting member 90 is inserted into engaged member 21b, and thus the movement of forward/backward member 11 is restricted.

On the other hand, because the biasing member is not provided in restricting portion 83A, restricting portion 83A is stationary without moving forward due to the frictional resistance of a sealing member (not illustrated) provided between pushing force transmission member 83a illustrated in FIG. 10 and guide portion 83d.

Therefore, as illustrated in FIG. 15, the end portion of limiting member 90 inserted into recessed portion 83c1 of restricting member 83c is in contact with only engaged member 21b without being in contact with restricting member 83c. This restricts the movement of restricting member 21*a* in the forward direction, thereby maintaining the state in which fuel lid 120 is kept closed as illustrated in FIG. 14.

Next, with reference to FIGS. 16 and 17, the state of forward/backward movement device 1A when only forward/backward member 11 is pushed in will be described.

Figure 16:
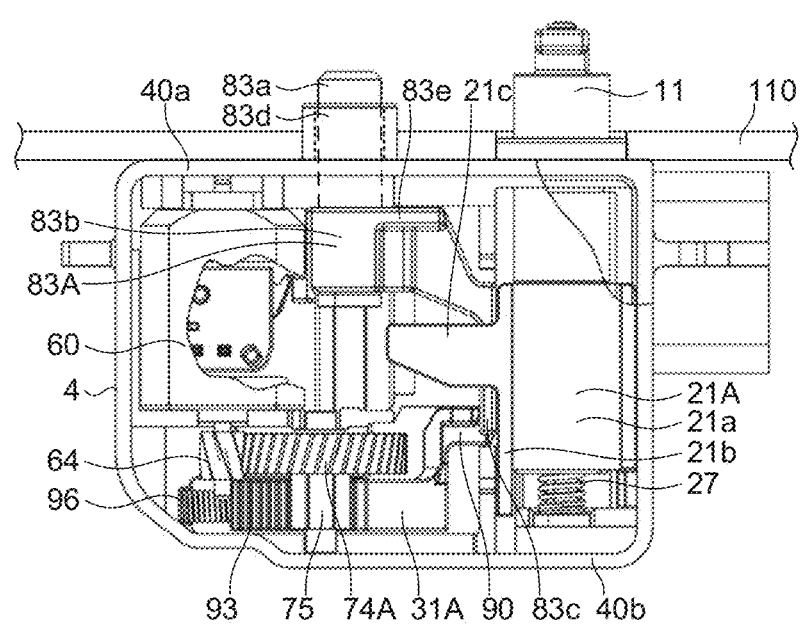
Figure 17:
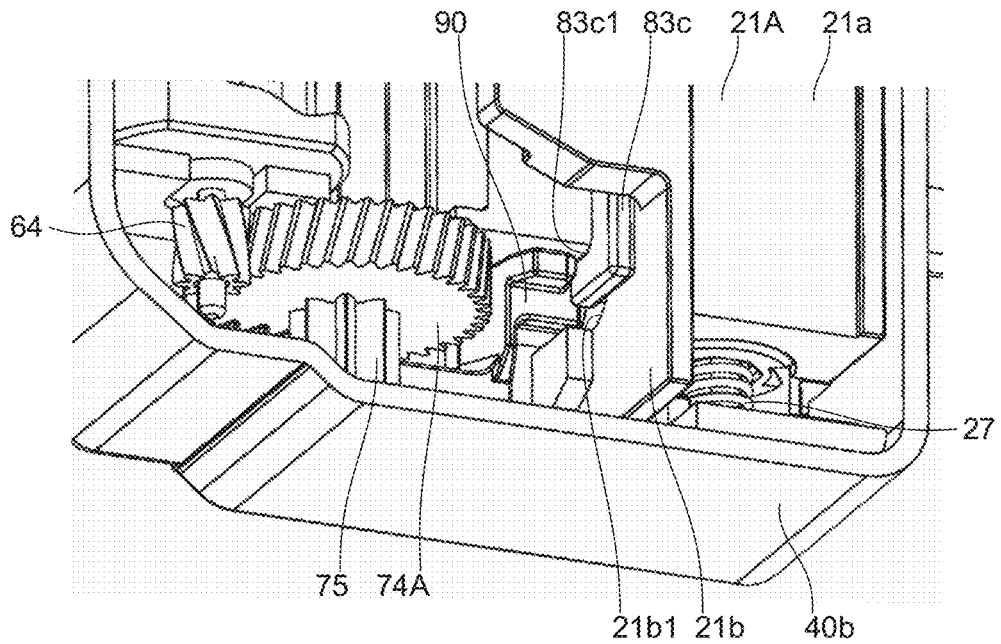
FIG. 17 is an enlarged view of a part of forward/backward movement device 1A illustrated in FIG. 16.

FIG. 16 illustrates a state of forward/backward movement device 1A when only forward/backward member 11 is pushed in, and FIG. 17 is an enlarged view of a part of forward/backward movement device 1A illustrated in FIG. 16.

As illustrated in FIG. 16, when only forward/backward member 11 is pushed in by mischief or the like, forward/backward member 11 moves in the backward direction against the biasing force of biasing member 27, and engaged member 21*b* approaches back-side wall portion 40*b*.

At this time, pushing force transmission member 83*a* is not pushed in and restricting portion 83A does not move backward. When engaged member 21*b* moves in a direction approaching back-side wall portion 40*b*, recessed portion 21*b*1 of engaged portion 21*b* moves to a position into which limiting member 90 can be inserted, and limiting member 90 slightly moves toward engaged member 21*b* by the biasing force of biasing member 96 as illustrated in FIG. 17. However, the end portion of limiting member 90 is in contact with the end portion of restricting member 83*c*, and the movement toward engaged member 21*b* is restricted. Thus, the movement of limiting member 90 from the above-described first position to the second position is restricted. Therefore, as illustrated in FIG. 17, the end portion of limiting member 90 is not inserted into recessed portion 21*b*1 of engaged member 21*b*, and forward/backward member 11 can move forward. As a result, forward/backward member 11 pushed by mischief or the like moves in the forward direction and returns to the original position.

Next, with reference to FIGS. 18 and 19, the state of forward/backward movement device 1A when only pushing force transmission member 83*a* is pushed in will be described.

Figure 18:
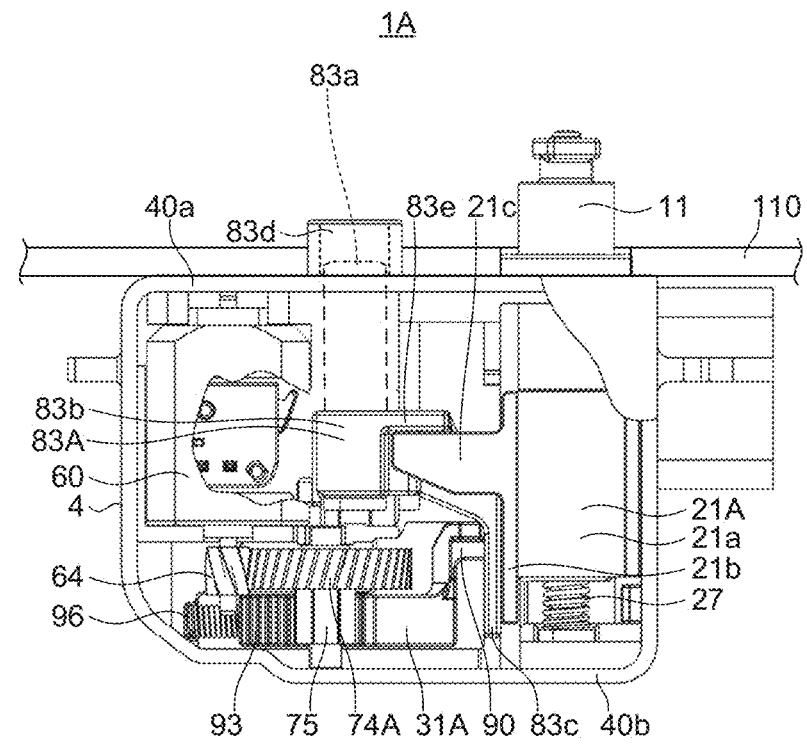
Figure 19:
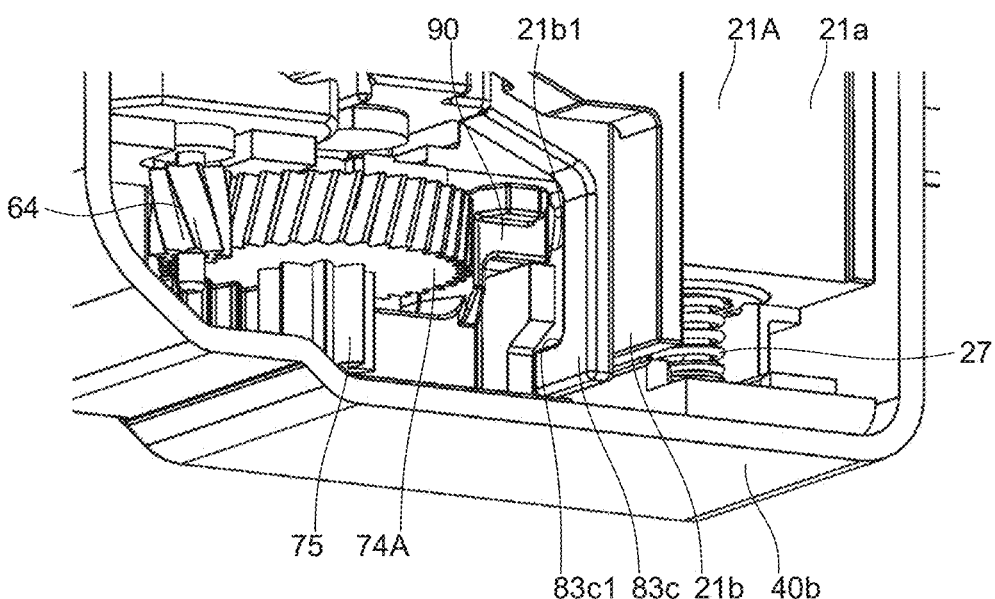
FIG. 19 is an enlarged view of a part of forward/backward movement device 1A illustrated in FIG. 18.

FIG. 18 is a diagram for describing the operation of forward/backward movement device 1A when only pushing force transmission member 83*a* is pushed in, and FIG. 19 is an enlarged view of a part of forward/backward movement device 1A illustrated in FIG. 18.

As illustrated in FIG. 18, when only pushing force transmission member 83*a* is pushed in by a finger of a person or the like by mischief or the like, engaging member 83*e* of restricting portion 83A pushes engaged member 21*c* of forward/backward-member-side member 21A, and forward/backward-member-side member 21A moves backward together with restricting portion 83A.

Even when pushing force transmission member 83*a* is pushed in by a certain amount at this time, forward/backward member 11 moves backward together with forward/backward-member-side member 21A that rotatably holds forward/backward member 11, and thus forward/backward member 11 is pushed back by the biasing force of biasing member 27.

Further, since pushing force transmission member 83*a* and biasing member 27 are not arranged in a straight line, when pushing force transmission member 83*a* is pushed in, a rotational moment is generated on forward/backward-member-side member 21A. Thus, the movement of limiting member 90 from the above-described first position to the second position is restricted unless the pushing force transmission member 83*a* is pushed in with a strong force. Specifically, because a strong force is required when forward/backward member 11 is made to move in the backward direction by pushing force transmission member 83*a*, it is difficult to move forward/backward member 11 to a position at which limiting member 90 can be inserted into recessed portion 21*b*1 of engaged member 21 and recessed portion 83*c*1 of restricting member 83*c*. This can prevent limiting member 90 from restricting the movement of forward/backward movement 11 in the forward direction.

As described above, according to forward/backward movement device 1A, the restriction of the forward movement of forward/backward member 11 can be prevented with a simple configuration when only pushing force transmission member 83*a* is pushed in by mischief or the like.

Further, biasing member 84 illustrated in FIG. 2 is not required for forward/backward movement device 1A; therefore, the configuration of forward/backward movement device 1A can be simplified, the reliability of forward/backward movement device 1A can be enhanced, and the manufacturing cost of forward/backward movement device 1A can be reduced.

Further, forward/backward movement device 1A can use a commonly-used rotation gear, which enhances the flexibility of designing forward/backward movement device 1A.

Note that, for example, the following aspects are also understood to fall within the technical scope of the present disclosure.

(1) A forward/backward movement device includes: a case; a forward/backward member that moves forward in a direction from an inside of the case to an outside thereof, or moves backward in a direction opposite to the direction, the forward/backward member including one end side housed in the case and another end side protruding from the case; a biasing member that biases the forward/backward member; a moving member that is housed in the case and moves between a first position where the forward/backward member is capable of moving forward by a biasing force generated by the biasing member and a second position where the forward movement of the forward/backward member is stopped; and a restricting member that restricts a movement of the moving member by moving to a position for restricting the moving member while a lid is open, in which the restricting member restricts a movement of the moving member from the first position to the second position in a case where the forward/backward member moves backward while the lid is open.

(2) The forward/backward movement further includes a rotational force transmission member that transmits a rotational force by a motor or manual operation to move the moving member by the rotational force, and the restricting member restricts a movement of the rotational force transmission member in the case where the forward/backward member moves backward while the lid is open.

(3) The restricting member restricts the movement of the rotational force transmission member by being locked to the rotational force transmission member.

(4) The rotational force transmission member is a gear, and the restricting member stops rotation of the gear in the case where the forward/backward member moves backward while the lid is open.

(5) The gear is D-cut processed, and the restricting member stops the rotation of the gear by being in contact with a D-cut surface in the case where the forward/backward member moves backward while the lid is open, and allows the rotation of the gear by being away from the D-cut surface in the case where the forward/backward member moves backward while the lid is open.

(6) The restricting member moves together with a pushing force transmission member that transmits a pushing force generated when the lid is closed, and restricts the movement of the moving member when the pushing transmission member is pushed in an inside of the case as a result of the lid being positioned in a closed state.

(7) The forward/backward movement device further includes: a forward/backward-member-side member that moves forward and backward together with the forward/backward member within the case while rotatably holding the forward/backward member; and a pushing force transmission member that transmits a pushing force generated when the lid is closed, in which the moving member is in contact with the restricting member and is not engaged with the forward/backward-member-side member so as to allow a forward movement of the forward/backward member in a case where the pushing force transmission member moves forward and the forward/backward-member-side member moves backward while the lid is open.

(8) The forward/backward movement device further includes: a forward/backward-member-side member that moves within the case while rotatably holding the forward/backward member; and a pushing force transmission member that transmits a pushing force generated when the lid is closed, in which the moving member is not engaged with each of the restricting member and the forward/backward-member-side member so as to allow a forward movement of the forward/backward member in a case where the pushing force transmission member and the forward/backward-member-side member each move backward while the lid is open.

It should be understood that the embodiment disclosed herein is illustrative and non-restrictive in all respects. It is intended that the scope of the invention be defined by the appended claims rather than the above description, and that all changes within the meaning and range of equivalency of the claims be included in the claims.

The embodiment of the present invention has been described above. It should be noted that the above description is illustrative of a preferred embodiment of the present invention, and the scope of the present invention is not limited thereto. That is, the configuration of the device and the shape of each part are merely an example, and it is obvious that various modifications and additions to these examples are possible within the scope of the present invention.

This application is based upon Japanese Patent Application No. 2021-070343 filed on Apr. 19, 2021, the entire contents of which are incorporated herein by reference.

INDUSTRIAL APPLICABILITY

The forward/backward movement device according to the present invention is useful as a device capable of preventing the forward/backward member from being locked.

REFERENCE SIGNS LIST

1 Forward/backward movement device
1A Forward/backward movement device
2 Vehicle body
2a Oil filler opening portion
4 Case
11 Forward/backward member
12 Lid securing portion
21 Forward/backward-member-side member
21A Forward/backward-member-side member
21a Restricting member
21b Engaged member
21c Engaged member
21b1 Recessed portion
24 Recessed portion
27 Biasing member
31 Moving member
31A Moving member
40a Front-side wall portion
40b Back-side wall portion
60 Driving portion
64 Rotation gear
74 Rotation gear
74A Rotation gear
74a D-cut surface
75 Pinion gear
80 Pressing force transmission portion
83 Restricting portion
83A Restricting portion
83a Pushing force transmission member
83b Internal member
83c Restricting member
83c1 Recessed portion
83d Guide portion
83e Engaging member
84 Biasing member
90 Limiting member
93 Rack gear
96 Biasing member
100 Opening and closing device
110 Body portion
120 Fuel lid
121 Protrusion
130 Hinge
140 Lid secured portion
160 Screw cap
P1 First position
P2 Second position

What is claimed is:

1. A forward/backward movement device in combination with a lid, the forward/backward movement device comprising:
a case;
a forward/backward member that moves forward in a direction from an inside of the case to an outside thereof, or moves backward in a direction opposite to the direction, the forward/backward member including one end housed in the case and another end protruding from the case;
a biasing member that biases the forward/backward member;
a moving member that is housed in the case and moves between a first position, in which the forward/backward member is capable of moving forward by a biasing force generated by the biasing member, and a second position, in which the forward movement of the forward/backward member is stopped; and
a first restricting member that restricts a movement of the moving member by moving to a position for restricting the moving member while the lid is open, wherein the first restricting member restricts a movement of the moving member from the first position to the second position when the forward/backward member is forced to move backward while the lid is open;
a forward/backward-member-side member that moves forward and backward together with the forward/backward member within the case while rotatably holding the forward/backward member; and a pushing force transmission member that transmits a pushing force generated when the lid is closed, wherein the moving member is restricted by the first restricting member from the moving from the first position to the second position and is not engaged with the forward/backward-member-side member so as to allow a forward movement of the forward/backward member when the pushing force transmission member moves forward and the forward/backward-member-side member is forced to move backward while the lid is open.

2. The forward/backward movement device according to claim 1, further comprising a rotational force transmission member that transmits a rotational force by a motor or manual operation to move the moving member by the rotational force, wherein the first restricting member restricts a movement of the rotational force transmission member when the forward/backward member is forced to move backward while the lid is open.

3. The forward/backward movement device according to claim 2, wherein the first restricting member restricts the movement of the rotational force transmission member by being locked to the rotational force transmission member.

4. The forward/backward movement device according to claim 2, wherein the rotational force transmission member is a gear, and the first restricting member stops rotation of the gear when the forward/backward member is forced to move backward while the lid is open.

5. The forward/backward movement device according to claim 4, wherein the gear is D-cut processed, and the first restricting member stops the rotation of the gear by being in contact with a D-cut surface when the forward/backward member is forced to move backward while the lid is open, and allows the rotation of the gear by being away from the D-cut surface when the forward/backward member moves backward while the lid is closed.

6. The forward/backward movement device according to claim 1, wherein the first restricting member moves together with a pushing force transmission member that transmits a pushing force generated when the lid is closed, and enables the movement of the moving member when the pushing transmission member is pushed in an inside of the case as a result of the lid being closed.

7. The forward/backward movement device in combination with the lid according to claim 1, wherein the forward/backward member is pushed toward the outside of the case by the biasing force of the biasing member and the moving member is not engaged with each of the first restricting member and the forward/backward-member-side member so as to allow a forward movement of the forward/backward-member-side member, when the pushing force transmission member and the forward/backward-member-side member each are forced to move backward while the lid is open and the pushing force transmission member is pushed in.

8. The forward/backward movement device in combination with the lid according to claim 1, wherein the forward/backward-member-side member comprises:

a second restricting member that restricts a forward position of the forward/backward member; and an engaged member that engages with an engaging member provided in a restricting portion that moves together with the pushing force transmission member.

9. The forward/backward movement device in combination with the lid according to claim 1, wherein the first restricting member moves together with the pushing force transmission member when the lid is closed, and enables the movement of the moving member when the pushing transmission member is pushed in an inside of the case as a result of the lid being closed.

* * * * *